United States Patent [19]

Kosegaki et al.

[11] Patent Number: 5,219,600

[45] Date of Patent: Jun. 15, 1993

[54] MOLDED PRODUCT FOR COLORED FOOD

[75] Inventors: Kimiho Kosegaki; Akiyoshi Onishi; Masaru Inoue; Takashi Mori; Kazuhisa Tachi, all of Yokkaichi, Japan

[73] Assignee: Mitsubishi Petrochemical Co., Ltd., Tokyo, Japan

[21] Appl. No.: 873,357

[22] Filed: Apr. 21, 1992

Related U.S. Application Data

[63] Continuation of Ser. No. 555,482, filed as PCT/JP89/01122 on Oct. 31, 1989, abandoned.

[30] Foreign Application Priority Data

May 31, 1989 [JP] Japan .................. 1-135858

[51] Int. Cl.$^5$ ............................. B65D 81/34
[52] U.S. Cl. ......................... 426/106; 426/415; 524/125; 524/151; 524/153
[58] Field of Search ............... 524/153, 151, 100, 101; 426/234, 297, 415, 106; 523/123

[56] References Cited

U.S. PATENT DOCUMENTS

| | | | |
|---|---|---|---|
| 4,075,163 | 2/1978 | Hofer et al. | 524/126 |
| 4,474,914 | 10/1984 | Spivack | 524/126 |
| 4,483,952 | 11/1984 | Uchiyama | 524/108 |
| 4,507,415 | 3/1985 | Kasai et al. | 524/108 |
| 4,933,216 | 6/1990 | Filbert et al. | 426/234 |

FOREIGN PATENT DOCUMENTS

| | | |
|---|---|---|
| 0290391 | 11/1988 | European Pat. Off. |
| 3508983 | 9/1985 | Fed. Rep. of Germany |
| 2512453 | 3/1983 | France |
| 53-28645 | 3/1978 | Japan |
| 58-160333 | 9/1983 | Japan |
| 60-99147 | 6/1985 | Japan |
| 61-255953 | 11/1986 | Japan |
| 62-273239 | 11/1987 | Japan |

OTHER PUBLICATIONS

D. G. Pobedimskii, et al: *Developments in Polymer Stabilization*-2, 125-126, G. S. Scott, ed. (1980).
Chemical Abstracts, vol. 111, 1989, Abstract No. 58982Y, Nakajima, J. et al, "Propylene polymer composition with good radiation resistance", p. 48.
World Patent Index Latest, Derwent Publications Ltd., AN 89-088866, for JP-A-01 038 457, Feb. 8, 1989.

*Primary Examiner*—Veronica P. Hoke
*Attorney, Agent, or Firm*—Frishauf, Holtz, Goodman & Woodward

[57] ABSTRACT

A molded product for colored food, comprising (A) 0.01 to 1 part by weight of a hindered amine type light stabilizer and (B) 0.01 to 0.5 part by weight of an aromatic phosphite type and/or an aromatic phosphonite type antioxidant formulated per 100 parts by weight of a polyolefin containing substantially no phenol type antioxidant is disclosed.

The molded product for colored food made of a polyolefin and having the composition of the present invention undergoes no discoloration even when contacted with a colored food for a long time and is also excellent in odor characteristic, mechanical characteristics and stability, etc., and therefore excellent as molded product for colored food, particularly sealed vessel, vessel for microwave oven heating.

12 Claims, No Drawings

MOLDED PRODUCT FOR COLORED FOOD

This application is a continuation of application Ser. No. 07/555,482, filed Aug. 13, 1990, now abandoned which is the U.S. national phase application of PCT application Ser. No. PCT/JP 89/01122 filed Oct. 31, 1989.

BACKGROUND OF THE INVENTION

This invention relates to a molded product for colored food which undergoes discoloration with difficulty even when contacted with a colored food such as vegetables, fruits, etc.

Polyolefins are inexpensive and also have excellent molding characteristics, and hence have been widely used as food vessels or implements.

However, molded products made of polyolefins will undergo discoloration through contact with colored foods, for example, vegetables such as spinach, white rape, etc. and fruits. For solving this, for example, in Japanese Provisional Patent Publications No. 125450/1978, No. 36150/1984 and No. 113632/1986, polypropylenes formulated with additives such as sulfur type stabilizers, phenol type stabilizers, paraoxybenzoic acid or higher fatty acid alcohols, etc. have been known, but the effect is not satisfactory and further improvement has been desired.

Generally speaking, concerning discoloration of the molded product with a colored food of fresh vegetables and fruits and processed products thereof, its cause may include coloration with the dye contained in them, coloration through spoilage of vegetables, discoloration with the colorant for food, and further discoloration through mutual interaction between various additives and the dye, etc., but has not been clarified yet.

Also, polyolefin is generally susceptible to thermal oxidation deterioration due to its chemical structure, and cannot stand the heat during processing and use. For this reason, a product which can stand practical application can be obtained usually by formulation of an antioxidant for inhibition of thermal oxidation deterioration, but there ensues the problem that coloration from the colored food becomes more marked with the antioxidant. Further, inhibition of odor is another problem to be solved.

SUMMARY OF THE INVENTION

An object of the present invention is to provide a molded product for colored food which undergoes such discoloration caused by contact with colored food with difficulty, and is also excellent in mechanical characteristics, transparency, heat-resistant aging characteristic and inhibition of odor.

The present invention is a molded product for colored food, comprising, (A) 0.01 to 1 part by weight of a hindered amine type light stabilizer, and (B) 0.01 to 0.5 part by weight of an aromatic phosphite type and/or an aromatic phosphonite type antioxidant formulated per 100 parts by weight of a polyolefin containing substantially no phenol type antioxidant.

DETAILED DESCRIPTION OF THE INVENTION

The polyolefin to be used in the present invention may include homopolymers of α-olefin such as ethylene, propylene, 1-butene, 1-pentene, 1-hexene, 4-methylpentene-1, etc., random copolymers, block polymers, alternate polymers, graft polymers, etc. mutually between α-olefins, or of these α-olefins with other copolymerizable monomers (vinyl ester such as vinyl acetate, etc., unsaturated organic acids or esters thereof such as acrylic acid, maleic anhydride, ethyl acrylate, etc.).

Specifically, there may be included low-density polyethylene, medium-density polyethylene, high-density polyethylene, linear low-density polyethylene, ultra-low-density polyethylene, propylene-ethylene random and block copolymers, propylene-1-butene copolymer, propylene-ethylene-1-butene copolymer, poly-4-methylpentene-1, etc.

Preferred polyolefins as a food vessel may include ethylene polymers such as low-density polyethylene, medium-density polyethylene, high-density polyethylene, linear low-density polyethylene, etc., propylene homopolymer, propylene-ethylene random or block copolymer, propylene-1-butene copolymer, propylene-ethylene-1-butene copolymer, etc., but among them most preferred are propylene homopolymer and propylene-ethylene random and block copolymers.

These polyolefins are required to contain substantially no phenol type antioxidant. If a phenol type antioxidant exists substantially, the effect of the present invention will be undesirably inhibited. Here, "substantially" means that an amount to the extent which does not inhibit the effect of the present invention may be permitted to be contained.

Specific examples of the hindered amine type light stabilizer which is the component (A) to be used in the present invention may include:

(1) polycondensate of dimethyl succinate and 1-(2-hydroxyethyl)-4-hydroxy-2,2,6,6-tetramethylpiperidine, (2) poly[[6-(1,1,3,3-tetramethylbutyl)imino-1,3,5-triazine-2,4-diyl][(2,2,6,6-tetramethyl-4-piperidyl)imino]-hexamethylene[[2,2,6,6-tetramethyl-4-piperidyl-)imino]], (3) bis(1,2,2,6,6-pentamethyl-4-piperidyl)ester of 2-(3,5-di-t-butyl-4-hydroxybenzyl)-2-n-butylmalonic acid, (4) tetrakis(2,2,6,6-tetramethyl-4-piperidyl)1,2,3,4-butane-tetracarboxylate, (5) bis(2,2,6,6-tetramethyl-4-piperidyl)sebacate, (6) polycondensate of N,N'-bis(2,2,6,6-tetramethyl-4-piperidyl)hexamethylenediamine and 1,2-dibromoethane, (7) poly[2-N,N'-bis(2,2,6,6-tetramethyl-4-piperidyl)-hexamethylenediamine-4-(N-morpholino)symtriazine], (8) 1,1'-(1,2-ethanediyl)-bis(3,3,5,5-tetramethylpiperazinone), (9) tris(2,2,6,6-tetramethyl-4-piperidyl)-dodecyl-1,2,3,4-butanetetracarboxylate,

(10) tris(1,2,2,6,6-pentamethyl-4-piperidyl)-dodecyl-1,2,3,4-butanetetracarboxylate,

(11) bis(1,2,2,6,6-pentamethyl-4-piperidyl)sebacate, etc.

Particularly, those with molecular weights of 500 or more are preferred in the points of compatibility and excellent effects. Among them, the most suitable compounds are (1), (2), (4) and (7) as mentioned above. The amount of the component (A) is 0.01 to 1 part by weight, preferably 0.02 to 0.5 part by weight, per 100 parts by weight of the polyolefin. With an amount less than this, heat resistance is not sufficient, while with an excessive amount, it is not only uneconomical, but there ensues undesirably the problem of discoloration and the problem of bleeding.

Specific examples of the antioxidant of the above component (B) to be used in the present invention may include:

(12) tris(mixed mono- and dinonylphenyl)phosphite,
(13) tris(2,4-di-t-butylphenyl)phosphite,
(14) 4,4'-butylidene bis(3-methyl-6-t-butylphenyl-di-tridecyl)-phosphite,
(15) 1,1,3-tris(2-methyl-4-di-tridecylphosphite-5-t-butylphenyl)butane,
(16) bis(2,4-di-t-butylphenyl)pentaerythritol-diphosphite,
(17) tetrakis(2,4-di-t-butylphenyl)-4,4'-biphenylenephosphonite,
(18) bis(2,6-di-t-butyl-4-methylphenyl)pentaerythritol-diphosphite,
(19) 2,2'-ethylidene bis(4,6-di-t-butylphenyl)fluorophosphite,
(20) methylene bis(4,6-di-t-butylphenyl)-2-ethylhexyl-phosphite, etc. Among them, preferred are compounds of (13), (17), (18), (19) and (20), and most preferred are (13) and (17). The amount of the component (B) formulated is 0.01 to 0.5 part by weight, preferably 0.02 to 0.3 part by weight, per parts by weight of the polyolefin. With an amount less than this, stability during molding and the inhibition effect of odor become insufficient, having also delicate influence on the mechanical characteristics of the molded product, while with an excessive amount, it is not only uneconomical, but also there ensues the problem of discoloration.

In the present invention, in addition to these essential components, other additive components can be formulated within the range which does not remarkably damage the effect of the invention. Particularly, formulation of an organic nucleating agent is preferred for enhancing remarkably transparency and rigidity. Examples of such organic nucleating agent may include:

(21) 1,3,2,4-di-benzylidene-sorbitol,
(22) 1,3,2,4-bis(p-methyl-benzylidene)sorbitol,
(23) 1,3,2,4-bis(p-ethyl-benzylidene)sorbitol,
(24) 1,3,2,4-bis(2',4'-di-methyl-benzylidene)sorbitol,
(25) 1,3-(p-chloro-benzylidene)-2,4-(p-methyl-benzylidene)sorbitol,
(26) 1,3,2,4-di(p-propyl-benzylidene)sorbitol,
(27) 1,3-benzylidene-2,4-(p-methylbenzylidene)sorbitol,
(28) 1,3-benzylidene-2,4-(p-ethylbenzylidene)sorbitol,
(29) 1,3-(P-methylbenzylidene)-2,4-(O-methylbenzylidene)sorbitol,
(30) 1,3-(O-methylbenzylidene)-2,4-(P-methylbenzylidene)sorbitol,
(31) aluminum-mon-hydroxy-bis(p-t-butylbenzoate),
(32) sodium bis(4-t-butylphenyl)phosphate,
(33) sodium 2,2'-methylene-bis(4,6-di-t-butyl-phenyl)-phophate,
(34) sodium benzoate, etc. Among them, preferred are (21), (22), (23), (25), (31) and (33). Most preferred are (21), (22), (23), (25) and (33). The amount of the above organic nucleating agent added is 0.01 to 1 part by weight, preferably 0.03 to 0.5 part by weight, per 100 parts by weight of the polyolefin. With an amount less than this, the effect is inferior. On the other hand, with an excessive amount, it is not only uneconomical, but there will ensue undesirably such problems as bleeding, odor.

As other additional components, there may be included lubricants such as fatty acid amides, silicon oils, etc., antistatic agents such as glycerine esters of fatty acids, amine type or amide type, etc., inorganic fillers such as talc, barium sulfate, etc., molecular weight controllers such as peroxides, etc., chemical blowing agents, organic or inorganic pigments, fluorescent whitening agents, UV absorbers, antioxidants other than the phenol type, anti-fungus agents of the organic type or the inorganic type such as silver ions, copper ions, etc., neutralization agents, acidity controllers, etc.

The composition comprising these components to be used in the present invention can be prepared according to conventional methods. For example, the above components (A), (B), the organic nucleating agent and other components, if necessary, are added to the powder of a polyolefin, and the mixture is stirred and mixed by a Henschel mixer, followed by extrusion by melting and kneading through an extruder into pellets. Then, the pellets are generally processed into a desired vessel by means of a molding machine such as injection molding, compression molding, sheet molding, film molding, blow molding, vacuum molding, etc. Alternatively, it is also possible to use a method in which a masterbatch containing highly concentrated additive components is prepared, and this is added during molding processing. Preferably, vessels prepared according to injection molding are preferred with respect to appearance and uniformity of thickness.

The colored food as mentioned in the present invention refers to foods having dyes, including vegetables, fruits, seaweeds spinach, white rape, cabbage, carrot, salted plum, Japanese radish, *Chrysanthemum coronarium*, strawberry, sea tangle, etc., and processed foods of these. The molded product refers to those to be used for conveying, storing, cooking of these and for pickles, etc., including sealed vessels, vessel for pickles, food vessels, lunch boxes, cups, balls, water draining baskets, containers for transportation of foods, vessels for heating cooking such as for microwave oven, etc., bag overlap film, vessels for refrigerator lining, etc. as well as those to be used for implements such as chopping board, chopsticks, spoon, spatula, fork rice scoop, corner for water draining in sink, draining board juicer part for sink, mixer part, etc. Particularly preferably, the effects of the present invention can be exhibited greatly in sealed vessels, vessels for heating cooking such as for microwave oven, etc.

EXAMPLES 1-9, COMPARATIVE EXAMPLES 1-7

The components shown below were formulated in the amounts shown in Table 1 (% by weight) per 100 parts by weight of a propylene-ethylene random copolymer (MFR=10 g/10 min, ethylene content=3 % by weight), blended by a Henschel mixer, and then kneaded by a 30 mm$\phi$ extruder (240° C.). The pellets obtained were subjected to an injection molding machine (260° C.) to mold an injected vessel with a 2 mm thickness×7 cm (longitudinal)×11 cm (lateral)×4.5 cm (height). Into the vessel, white rape juice subjected to a mixer was charged and stored at 30° C. for 5 days. Then, the contents were taken out, washed with water and the discoloration degree of the vessel was judged by observation with eyes.

The judgement standards are as follows:
⊙: substantially no change recognized
○+: only slight change recognized
○: slightly discolored
Δ: clear discoloration X: considerably strongly discolored.

Transparency was measured by a haze meter (JIS K-6714). For Olsen flexural stiffness and Charpy impact strength, respective test strips were punched out from the vessel, and Olsen flexural stiffness was measured according to ASTM D747, and Charpy impact strength according to JIS K-7111. Also, a test strip of 65 mm×35 mm was cut out and placed in a gear oven of 120° C. for measurement of embrittlement time.

Also, the vessel was sealed with attachment of a lid, heated in an oven at 80° C. for one hour, and then the lid was opened for evaluation of odor with nose. The evaluation standards are as shown below.

⊚: substantially no smell
○+: slight smell
○: smell without attracting attention
Δ: considerable smell
X: excessive smell Component (A) (hindered amine type light stabilizer):
Compound of the above (1)
Compound of the above (2)
Compound of the above (4)
Component (B) (aromatic phosphite type, aromatic phosphonite type antioxidant):
Compound of the above (13)
Compound of the above (17)
Organic nucleating agent:
Compound of the above (21)
Compound of the above (22)
Compound of the above (23)
Other additives:
CAST: calcium stearate
DMTP: dimyristyl thiodipropionate
IR1010: tetrakis[methylenebis-3-(3',5'-di-t-butyl-4'-hydroxyphenyl)propionate]methane
TPNC: 1,1,3-tris(2-methyl-4-hydroxy-5-t-butylphenyl)-butane
TS5: glyceryl monostearate
AMS: N,N-bis(2-hydroxyethyl)stearylamine
OA: oleic acid amide
POAB: butyl paraoxybenzoate
STOH: stearyl alcohol

EXAMPLES 10-13, COMPARATIVE EXAMPLES 8-9

Evaluation was performed according to the same methods as in Examples 1 to 9 except for using a homopolypropylene (MFR=10 g/10 min). The results are shown in Table 2.

EXAMPLE 14

Into the vessels of Examples 10-14, aqueous 0.5% by weight solutions of Erythrosine and Acid Red which are colorants for food were charged and stored at 30° C./5 days. Then, the contents were discharged, and after washing with water, the discoloration degree of the vessel was judged by observation with eyes, whereby no change of the vessel with the both aqueous solutions was recognized.

EXAMPLES 15-20, COMPARATIVE EXAMPLES 10-13

By use of a linear low-density polyethylene (MFR: 30, density: 0.919) and a high-pressure process low-density polyethylene (MFR: 20, density: 0.918), the discoloration degrees of the vessels with the foods were judged according to the same methods as in Examples 1-9 to obtain the results shown in Table 3 and Table 4.

In this case, MFR was measured according to JIS K6760 under the conditions of a temperature of 190° C. and a load of 2.16 kg, and the density similarly according to JIS K6760.

EXAMPLE 21

By use of the propylene-ethylene random copolymer composition of Example 7, a spoon with a length of 12 cm and a thickness of 1.0 mm was injection molded (260° C.). This implement was immersed in white rape juice similarly as in Example 7, whereby substantially no change in color was recognized.

TABLE 1

(Propylene-ethylene random copolymer)

| Compound No. | (A) (1) | (A) (2) | (A) (4) | (B) (13) | (B) (17) | Organic nucleating agent (21) | Organic nucleating agent (22) | Organic nucleating agent (31) | CAST | Other components | Discoloration degree | Olsen flexural stiffness (kg/cm²) | Charpy impact (kg·cm/cm²) | Haze (%) | Embrittlement time (hr) | Odor |
|---|---|---|---|---|---|---|---|---|---|---|---|---|---|---|---|---|
| Example | | | | | | | | | | | | | | | | |
| 1 | 0.1 | | | 0.05 | | | | | 0.05 | | ⊚ | 7,300 | 8.2 | 69 | >500 | ○+ |
| 2 | | 0.1 | | 0.05 | | | | | 0.05 | | ⊚ | 7,350 | 8.5 | 67 | " | ○+ |
| 3 | | | 0.1 | | 0.05 | | | | 0.05 | | ⊚ | 7,300 | 8.5 | 67 | " | |
| 4 | | 0.1 | | 0.05 | | 0.25 | | | 0.05 | | ⊚ | 8,500 | 8.7 | 26 | " | ○ |
| 5 | 0.1 | | | 0.05 | | | 0.2 | | 0.05 | | ⊚ | 8,600 | 8.2 | 21 | " | |
| 6 | | 0.1 | | 0.05 | | | | 0.10 | 0.05 | | ⊚ | 10,200 | 8.0 | 30 | " | ○+ |
| 7 | | 0.05 | | 0.05 | | 0.25 | | | 0.05 | TS5 (0.3) | ⊚ | 8,600 | 8.8 | 25 | " | |
| 8 | 0.1 | | | | 0.10 | | | 0.10 | 0.05 | AMS (0.3) | ○+ | 10,300 | 8.0 | 30 | " | |
| 9 | | 0.1 | | 0.05 | | 0.25 | | | 0.05 | OA (0.1) | ○+ | 8,650 | 8.3 | 24 | " | |
| Comparative example | | | | | | | | | | | | | | | | |
| 1 | | | | | | | | | 0.05 | DMTP (0.1) | Δ | 7,000 | 6.9 | 70 | <72 | X |
| 2 | | | | | | | | | 0.05 | IR1010 (0.1) | Δ | 7,200 | 8.0 | 70 | >500 | Δ |
| 3 | | | | 0.05 | | | | | 0.05 | TPNC | X | 7,250 | 8.1 | 68 | >500 | |

TABLE 1-continued (Propylene-ethylene random copolymer)

| Compound No. | (A) (1) | (A) (2) | (A) (4) | (B) (13) | (B) (17) | (21) | (22) | (31) | Organic nucleating agent | Other components CAST | Other components | Discoloration degree | Olsen flexural stiffness (kg/cm²) | Charpy impact (kg·cm/cm²) | Haze (%) | Embrittlement time (hr) | Odor |
|---|---|---|---|---|---|---|---|---|---|---|---|---|---|---|---|---|---|
| 4 | | 0.1 | | 0.6 | | | | | | 0.05 | (0.1) | Δ | 7,300 | 8.0 | 66 | <72 | Δ |
| 5 | | | | 0.05 | | 0.25 | | | | 0.05 | IR1010 (0.05) | Δ | 7,900 | 7.0 | 30 | >500 | |
| 6 | | | | | | | | | | 0.05 | IR1010 (0.1) POAB (0.2) | X | 7,200 | 8.0 | 71 | >500 | Δ |
| 7 | | | | | | | | | | 0.05 | IR1010 (0.1) STOH (0.3) | Δ | 7,000 | 8.1 | 73 | >500 | |

TABLE 2

(Homopolypropylene)

| Compound No. | (A) (1) | (A) (2) | (A) (7) | (B) (13) | (B) (17) | Organic nucleating agent (21) | Organic nucleating agent (31) | Other components CAST | Other components | Discoloration degree | Olsen flexural stiffness (kg/cm²) | Charpy impact (kg·cm/cm²) | Haze (%) | Embrittlement time (hr) |
|---|---|---|---|---|---|---|---|---|---|---|---|---|---|---|
| Example | | | | | | | | | | | | | | |
| 10 | 0.1 | | | 0.05 | | 0.3 | | 0.05 | | ⊚ | 16,000 | 3.2 | 38 | >400 |
| 11 | | 0.05 | | 0.05 | | | 0.15 | 0.05 | | ⊚ | 18,000 | 3.5 | 42 | >400 |
| 12 | | 0.05 | | | 0.05 | | | 0.05 | | ⊚ | 11,800 | 3.2 | 82 | >400 |
| 13 | | | 0.1 | | 0.1 | | 0.15 | 0.05 | | ○+ | 18,100 | 3.4 | 42 | >400 |
| Comparative example | | | | | | | | | | | | | | |
| 8 | 0.1 | | | | | | | 0.05 | IR1010 (0.05) | Δ | 10,900 | 3.0 | 88 | >400 |
| 9 | | | | | | | 0.2 | 0.05 | IR1010 (0.1) | X | 16,800 | 2.9 | 47 | <48 |

TABLE 3

(Linear low-density polyethylene)

| Compound No. | (A) (1) | (A) (2) | (A) (7) | (B) (13) | (B) (17) | CAST | Other compounds | Discoloration degree |
|---|---|---|---|---|---|---|---|---|
| Example | | | | | | | | |
| 15 | 0.1 | | | 0.05 | | 0.1 | | ⊚ |
| 16 | | 0.05 | | 0.05 | | 0.1 | | ⊚ |
| 17 | | | 0.05 | | 0.05 | 0.1 | OA (0.02) | ○ |
| Comparative example | | | | | | | | |
| 10 | | | | 0.05 | | 0.1 | IR1010 (0.1) | Δ |
| 11 | | | | 0.05 | | 0.1 | TNPC (0.1) | X |

TABLE 4

(High-pressure process low-density polyethylene)

| Compound No. | (A) (1) | (A) (2) | (A) (7) | (B) (13) | (B) (17) | CAST | Other compounds | Discoloration degree |
|---|---|---|---|---|---|---|---|---|
| Example | | | | | | | | |
| 18 | 0.1 | | | 0.05 | | | | ⊚ |
| 19 | | 0.05 | | 0.05 | | | | ⊚ |
| 20 | | | 0.05 | | 0.05 | | | ⊚ |
| Comparative example | | | | | | | | |
| 12 | | | | 0.05 | | | IR1010 (0.1) | Δ |
| 13 | | | | 0.05 | | | TNPC (0.1) | X |

As is apparent from the above test results, the molded product for colored food made of a polyolefin having the composition of the present invention undergoes no discoloration even when contacted with a colored food and also is excellent in odor characteristics, mechanical characteristics and stability, etc., and therefore excellent as molded product for colored food, particularly sealed vessels, vessels for heating by microwave oven, etc.

The fact that coloration of the molded product with colored foods of the present invention can be inhibited is entirely unexpected at the present stage when the coloration cause has not been clarified, and also it has been difficult to find out one having mechanical characteristics, no odor and also sufficient characteristic of durability (embrittlement time) in combination as molded product.

We claim:

1. A sealed vessel containing vegetables, fruits or seaweeds, said vessel not having been or being subjected to gamma irradiation, said vessel being resistant to coloration occurred in said vessel when said vessel is in contact with said vegetables, fruits or seaweeds, said vessel consisting essentially of at least one polyolefin selected from the group consisting of a propylene homopolymer, a propylene-ethylene random copolymer, and propylene-ethylene block copolymer, a propylene-1-butene copolymer and a propylene-ethylene-1-butene copolymer, said polyolefin containing substantially no phenol type antioxidant, 0.02 to 0.3 part by weight of a hindered amine type light stabilizer with a molecular weight of 500 or more, 0.02 to 0.3 part by weight of at least one of an aromatic phosphite type and an aromatic phosphonite type antioxidant and 0.01 to 1.0 part by weight of an organic nucleating agent, formulated per 100 parts by weight of said polyolefin.

2. The vessel for colored food according to claim 1, wherein the polyolefin is at least one polymer selected from the group consisting of propylene homopolymers, propylene-ethylene random copolymers and propylene-ethylene block copolymers.

3. The vessel for colored food according to claim 1, wherein the hindered amine type light stabilizer is at least one compound selected from the group consisting of polycondensate of dimethyl succinate and 1-(2-hydroxyethyl)-4-hydroxy-2,2,6,6-tetramethylpiperidine, poly[[6-(1,1,3,3-tetramethylbutyl)imino-1,3,5-triazine-2,4-diyl][(2,2,6,6-tetramethyl-4-piperidyl)imino]-hexamethylene[[2,2,6,6-tetramethyl-4-piperidyl)imino]], tetrakis(2,2,6,6-tetramethyl-4-piperidyl)1,2,3,4-butane tetracarboxylate and poly[2-N,N'-bis(2,2,6,6-tetramethyl-4-piperidyl)hexamethylenediamine-4-(N-morpholino)symtriazine].

4. The vessel for colored food according to claim 1, wherein said at least one of an aromatic phosphite type and an aromatic phosphonite type antioxidant is at least one selected from the group consisting of tris(2,4-di-t-butylphenl)phosphite, tetrakis(2,4-di-t-butylphenyl)-4,4'-biphenylenephosphonite, bis(2,6-di-t-butyl-4-methylphenyl)pentaerythritol-di-phosphite, 2,2'-ethylidene bis(4,6-di-t-butylphenyl)fluorophosphite and methylene bis(4,6-di-t-butylphenyl)-2-ethylhexylphophite.

5. The vessel for colored food according to claim 4, wherein said at least one of an aromatic phosphite type and an aromatic phosphonite type antioxidant is at least one of tris(2,4-di-t-butylphenyl)phosphite and tetrakis(2,4-di-t-butylphenyl)-4,4'-biphenylenephosphonite.

6. The vessel for colored food according to claim 1, wherein said organic nucleating agent is in an amount of 0.03 to 0.5 part by weight per 100 parts by weight of said polyolefin.

7. The vessel for colored food according to claim 3, wherein said at least one of an aromatic phosphite type and an aromatic phosphonite type antioxidant is at least one selected from the group consisting of tris(2,4-di-t-butylphenyl)phosphite, tetrakis(2,4-di-t-butylphenyl)-4,4'-biphenylenephosphonite, bis(2,6-di-t-butyl-4-methylphenyl)pentaerythritol-di-phosphite, 2,2'-ethylidene bis(4,6-di-t-butylphenyl)fluorophosphite and methylene bis(4,6-di-t-butylphenyl)-2-ethylhexyl-phosphite.

8. The vessel for colored food according to claim 3, wherein said at least one of an aromatic phosphite type and an aromatic phosphonite type antioxidant is at least one of tris(2,4-di-t-butylphenyl)phosphite and tetrakis(2,4-di-t-butylphenyl)-4,4'-biphenylenephosphonite.

9. The vessel for colored food according to any of claims 1, 2, 5, 6 and 8, wherein the vessel is a vessel for cooking.

10. A method for storing vegetables, fruits or seaweeds in a vessel and avoiding coloration occurred in said vessel when said vessel is in contact with said vegetables, fruits or seaweeds, the method comprising positioning said vegetables, fruits or seaweeds in a vessel which has not been subjected to gamma irradiation and not irradiating gamma rays to said vessel, said vessel consisting essentially of (a) at least one polyolefin selected from the group consisting of a propylene homopolymer, a propylene-ethylene random copolymer, a propylene-ethylene block copolymer, a propylene-1-butene copolymer and a propylene-ethylene-1-butene copolymer, said polyolefin containing substantially no phenol type antioxidant, (b) 0.02 to 0.5 part by weight of a hindered amine type light stabilizer with a molecular weight of 500 or more, (c) 0.02 to 0.3 part by weight of at least one of an aromatic phosphite type and an aromatic phosphonite type antioxidant, and (d) 0.01 to 1.0 part by weight of an organic nucleating agent, formulated per 100 parts by weight of the polyolefin.

11. The method according to claim 10, wherein the hindered amine type light stabilizer is at least one compound selected from the group consisting of a polycondensate of dimethyl succinate and 1-(2-hydroxyethyl)-4-hydroxy-2,2,6,6-tetramethylpiperidine, poly((6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)), tetrakis(2,2,6,6-tetramethyl-4-piperidyl)1,2,3,4-butane tetracarboxylate and poly(2-N,N'-bis(2,2,6,6-tetramethyl-4-piperidyl)-hexamethylenediamine-4-(N-morpholino)symtriazine; and the at least one of an aromatic phosphite type and an aromatic phosphonite type antioxidant is selected from the group consisting of tris(2,4-di-t-butylphenyl)-phosphite, tetrakis(2,4-di-t-butylphenyl)-4,4'-biphenylenephosphonite, bis(2,6-di-t-butyl-4-methylphenyl)pentaerythritol-di-phosphite, 2,2'-ethylidene bis(4,6-di-t-butylphenyl)fluorophosphite and methylene bis(4,6-di-t-butylphenyl)-2-ethylhexyl-phosphite.

12. The method according to claim 11, wherein the at least one of an aromatic phosphite type and an aromatic phosphonite type antioxidant is tris(2,4-di-t-butylphenyl)phosphite and tetrakis(2,4-di-t-butylphenyl)-4,4'-biphenylenephosphonite.

* * * * *